United States Patent
Shu

(10) Patent No.: US 9,916,291 B2
(45) Date of Patent: Mar. 13, 2018

(54) METHOD, APPARATUS, AND TERMINAL DEVICE FOR DISPLAYING MULTIPLE INPUT BOXES IN A WEB PAGE WHERE DISPLAY SPACE IS LIMITED

(71) Applicant: TENCENT TECHNOLOGY (SHENZHEN) COMPANY LIMITED, Shenzhen (CN)

(72) Inventor: Yuqiang Shu, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 951 days.

(21) Appl. No.: 14/284,700

(22) Filed: May 22, 2014

(65) Prior Publication Data

US 2014/0298161 A1    Oct. 2, 2014

Related U.S. Application Data

(63) Continuation of application No. PCT/CN2013/089116, filed on Dec. 11, 2013.

(30) Foreign Application Priority Data

Mar. 28, 2013   (CN) .......................... 2013 1 0105619

(51) Int. Cl.
G06F 17/00    (2006.01)
G06F 17/22    (2006.01)
(Continued)

(52) U.S. Cl.
CPC ........ *G06F 17/2247* (2013.01); *G06F 3/0481* (2013.01); *G06F 3/0485* (2013.01);
(Continued)

(58) Field of Classification Search
CPC ........... G06F 17/2247; G06F 17/30905; G06F 3/0481; G06F 3/04842; G06F 17/243; G06F 3/0485; H04M 1/72561
See application file for complete search history.

(56) References Cited

U.S. PATENT DOCUMENTS

| 2002/0085038 | A1* | 7/2002 | Cobbley | ............... G06F 3/0481 715/773 |
| 2006/0224947 | A1 | 10/2006 | Weber et al. | |
| 2009/0300056 | A1* | 12/2009 | Fu | ..................... G06F 17/30938 |

FOREIGN PATENT DOCUMENTS

| CN | 1841361 A | 10/2006 |
| CN | 102364424 A | 2/2012 |

OTHER PUBLICATIONS

International Search Report issued in International Application No. PCT/CN2013/089116 dated Mar. 20, 2014.
(Continued)

*Primary Examiner* — Cesar Paula
*Assistant Examiner* — James H Blackwell
(74) *Attorney, Agent, or Firm* — Fitzpatrick, Cella, Harper & Scinto

(57) ABSTRACT

A method, an apparatus, and a terminal device for displaying multiple input boxes in a web page are provided. The method includes: obtaining, by an obtaining unit using a processor, a focus input box in a web page currently displayed by a terminal device; searching, by a searching unit using a processor, for other input boxes in the web page in a preset distance range of the focus input box; rolling, by a rolling unit using a processor, the web page and/or canvas of the display screen of the terminal device when the other input boxes are located in a lower level of an interface, so that the focus input box and the other input boxes are
(Continued)

displayed in a visible area of the display screen of the terminal device simultaneously.

6 Claims, 7 Drawing Sheets

(51) Int. Cl.
*G06F 17/24* (2006.01)
*G06F 3/0485* (2013.01)
*G06F 3/0481* (2013.01)
*G06F 3/0484* (2013.01)
*G06F 17/30* (2006.01)
*H04M 1/725* (2006.01)

(52) U.S. Cl.
CPC ........ *G06F 3/04842* (2013.01); *G06F 17/243* (2013.01); *G06F 17/30905* (2013.01); *H04M 1/72561* (2013.01)

(56) References Cited

OTHER PUBLICATIONS

Chinese Office Action issued in corresponding Chinese Application No. 201310105619.4, dated Jun. 6, 2017.
Chinese Office Action issued in corresponding Chinese Application No. 201310105619.4 dated Sep. 27, 2017.

\* cited by examiner

METHOD, APPARATUS, AND TERMINAL DEVICE FOR DISPLAYING MULTIPLE INPUT BOXES IN A WEB PAGE WHERE DISPLAY SPACE IS LIMITED

CROSS-REFERENCE TO RELATED APPLICATIONS

This application is a continuation application of PCT Patent Application No. PCT/CN2013/089116, titled "Method, Apparatus, and Terminal Device For Displaying Multiple Input Boxes In a Web Page" filed on Dec. 11, 2013, which claims priority to a Chinese Patent Application No. 201310105619.4, filed on Mar. 28, 2013, titled "Method, apparatus, and terminal device for displaying multiple input boxes in a web page", both of which are incorporated herein in their entirety by reference.

TECHNICAL FIELD

The present disclosure relates to computer technology field, and in particular to a method, an apparatus, and a terminal device of displaying multiple input boxes in a web page.

BACKGROUND

As the development of mobile devices and Internet, people often get information on Internet through a mobile terminal. In the webpage browsing, it typically needs to input login information in a login page of the web page, or input register information in multiple input boxes of a register page, wherein, a register page or a login page typically includes multiple input boxes. However, because the display screen space of a mobile terminal is limited, in the input process to the multiple input boxes, the case in which the input cannot be made due to the input boxes being covered by other interfaces often occurs, for example, the input boxes may be covered by a soft keyboard of an input method editor (IME).

FIG. 1 is a schematic diagram showing a web page including multiple input boxes. Referring to FIG. 1, the input process to multiple input boxes is as follows: after clicking the account number box A, the soft keyboard of the IME is popped up. Other input boxes B, C, and D are covered by the soft keyboard, that is, at the moment, only the operation to the box A can be made. Inputting a password into the password box B can be made only after the IME is turned off, the soft keyboard is removed, and the password box B is clicked again. After the input to password box B is finished, the clicking on a confirm box can be made only after the IME is turned off and the soft keyboard is removed, because the confirmation button is also be covered by the soft keyboard.

To sum up, in the prior art, when multiple input boxes of a web page of a mobile terminal is operated, the operations on other input boxes can be realized only after interface is turned off or a web page is manually moved.

SUMMARY OF THE DISCLOSURE

The embodiments of the present disclosure provide a method, an apparatus, and a terminal device of displaying multiple input boxes in a web page, in order to avoid the case in which when the multiple input boxes in the web page are operated, the input box is covered by other interfaces, the operations to the input box can be made only the interface is turned off or the web page is manually moved.

A first aspect of the present disclosure provides a method of displaying multiple input boxes in a web page, the method includes: obtaining, by an obtaining unit using a processor, a focus input box in a web page currently displayed by a terminal device; searching, by a searching unit using a processor, for other input boxes in the web page in a preset distance range of the focus input box; rolling, by a rolling unit using a processor, the web page and/or canvas of the display screen of the terminal device when the other input boxes are located in a lower level of an interface, so that the focus input box and the other input boxes are displayed in a visible area of the display screen of the terminal device simultaneously.

A second aspect of the present disclosure provides an apparatus for displaying multiple input boxes in a web page, the apparatus includes: an obtaining unit using a processor and configured to obtain a focus input box in a web page currently displayed by a terminal device; a searching unit using a processor and configured to search for other input boxes in the web page in a preset distance range of the focus input box; a rolling unit using a processor and configured to roll the web page and/or canvas of the display screen of the terminal device when the other input boxes are located in a lower level of an interface, so that the focus input box and the other input boxes are displayed in a visible area of the display screen of the terminal device simultaneously.

A third aspect of the present disclosure provides a terminal device including the apparatus for displaying multiple input boxes in the web page provided by the second aspect of the present disclosure therein.

A fourth aspect of the present disclosure provides a non-transitory computer-readable storage medium storing program instructions, when the program instructions are executed on a computer, the program instructions cause the computer to execute the respective steps of the method according to the first aspect of the present disclosure.

The advantageous effects of the embodiments of the present disclosure are in that when the operation to focus input box is made, if there are also the other input boxes in the current page and the other input boxes are located in a lower level of an interface, the other input boxes in the current page can be moved to a visible area of the display screen of the terminal device automatically, so that there is no need to turn off the other interfaces or move the web page to operate the input box directly in the operation process to the input box.

BRIEF DESCRIPTION OF THE DRAWINGS

In order to illustrate the embodiments of the present disclosure clearly, in the following, a simple introduction of the accompanying drawings used in the description of the embodiments of the present disclosure will be given. Obviously, the drawings in the following description are just some embodiments of the present disclosure. For those skilled in the art, other accompanying drawings can be obtained without creative efforts according to these accompanying drawings.

DESCRIPTION OF THE EMBODIMENTS

To make the object, the technical solution and advantages of the present disclosure more apparent, in the following, a more detailed description of the present disclosure will be given in conjunction with the accompanying drawings and the embodiments. It should be understood that the concrete embodiments shown here are only used to explain the present disclosure, not to limit the range of the protection of the present disclosure.

In the respective embodiments of the present disclosure, the following operations will be carried out: obtaining a focus input box in a web page currently displayed by a terminal device; searching for the other input boxes in the web page in a preset distance range of the focus input box; rolling the web page and/or the canvas of the display screen of the terminal device when the other input boxes are located in a lower level of an interface, so that the focus input box and the other input boxes are displayed in a visible area of the display screen of the terminal device simultaneously. There is no need to turn off the other interfaces or move the web page to operate the input box directly.

In the following, a detailed description of realizing the present disclosure will be given in conjunction with the specific embodiments.

Figure 2:
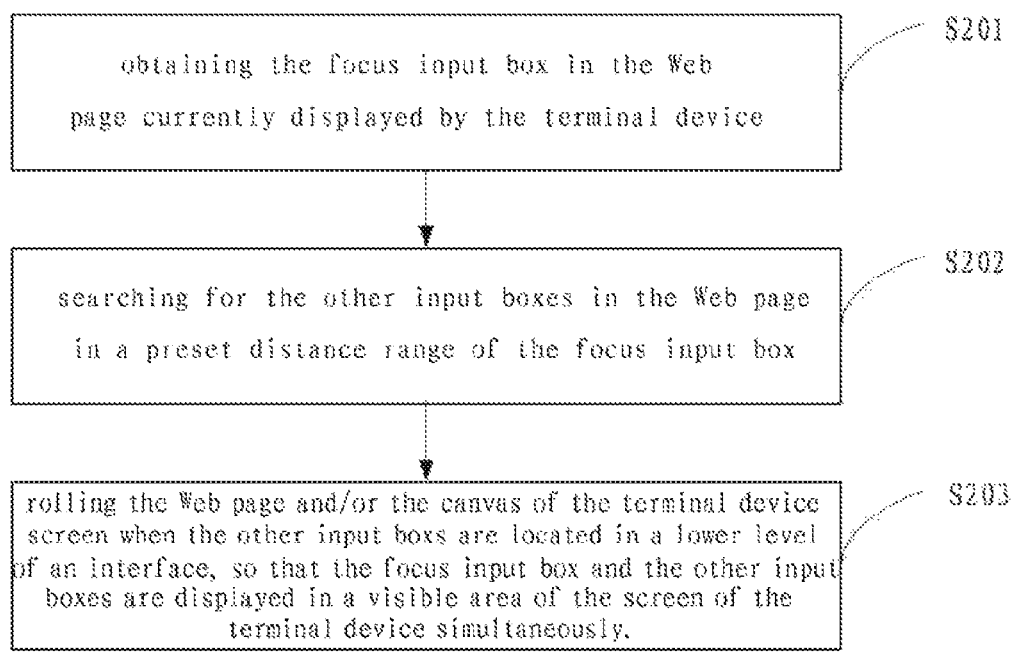
FIG. 2 is a schematic flowchart showing the realization of a method of displaying multiple input boxes in a web page according to one embodiment of the present disclosure.

FIG. 2 is a schematic flowchart showing the realization of a method of displaying multiple input boxes in a web page according to one embodiment of the present disclosure. The detailed description is as follows.

In step S201, the focus input box in the web page currently displayed by the terminal device is obtained.

In this embodiment, the terminal device may be a computer, a smart cellphone, a handheld computer, a panel computer, or the like. Especially, it is especially applied to portable terminal device which has a smaller display screen, such as a cellphone, a handheld computer a panel computer, or the like.

In this embodiment, the currently displayed the web page may be login page or register page, the focus input box may be an input box that the user is operating currently.

In step S202, the other input boxes in the web page are searched for in a preset distance range of the focus input box.

In this embodiment, the input box may be a button of a login or register page, for example, it may be a password input box, a confirmation button, or a cancellation button, or the like. The preset distance range may be the searching range that is preset in the program according to the user's need.

In step S203, when the other input boxes of the web page are found in the preset distance range of the focus input box, and the other input boxes are located in a lower level of an interface, the web page and/or the canvas of the display screen of the terminal device are (is) rolled, so that the focus input box and the other input boxes can be displayed in a visible area of the display screen of the terminal device simultaneously.

In this embodiment, the interface may be an interface in the currently displayed page, and it may also be an interface that floats in the currently displayed page, for example, the IME soft keyboard, various advertisement pages, or the like.

In this embodiment, the canvas of the display screen of the terminal device is a drawing level located on the lowest part of the display screen of the terminal device.

In this embodiment, the other input boxes are located in a lower level of an interface, that is, the input box is covered by the interface, the user can not execute an input operation onto the input box directly, the interface may be an interface of the IME soft keyboard, or interfaces of other application programs.

In this embodiment, the following operations will be carried out: obtaining a focus input box in a web page currently displayed by a terminal device; searching for the other input boxes in the web page in a preset distance range of the focus input box; rolling the web page and/or the canvas of the display screen of the terminal device when the other input boxes are located in a lower level of an interface, so that the focus input box and the other input boxes are displayed in a visible area of the display screen of the terminal device simultaneously. Because in the operation process to the input box, if there are also the other input boxes in the current page and the other input boxes are located in a lower level of an interface, the other input boxes in the current page can be moved to a visible area of the display screen of the terminal device automatically, there is no need to turn off the other interfaces or move the web page to operate the input box directly in the operation process to the input box.

Figure 3:
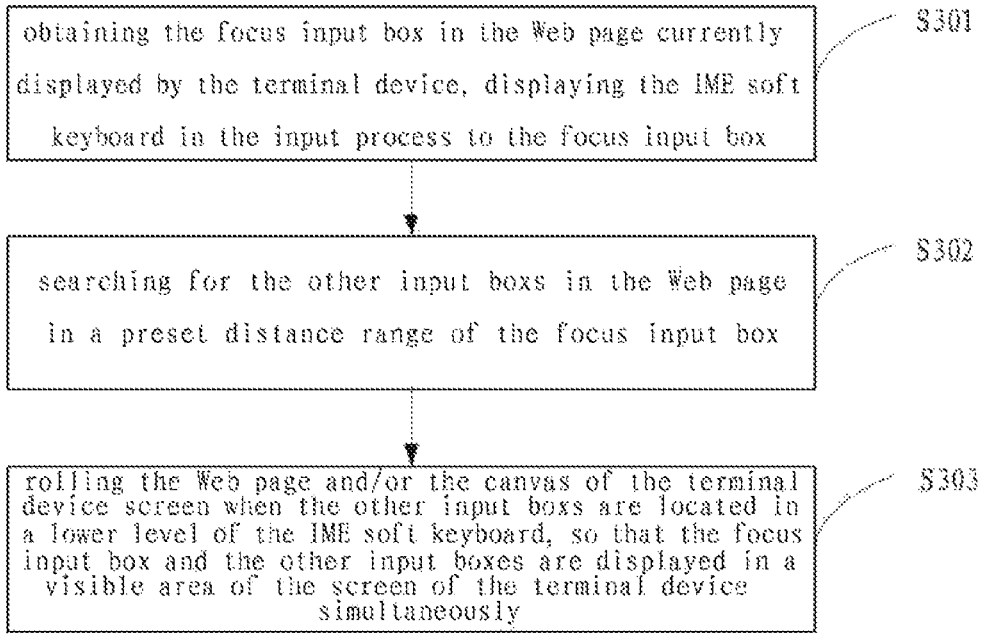
FIG. 3 is a schematic flowchart showing the realization of a method of displaying multiple input boxes in a web page according to another embodiment of the present disclosure.

FIG. 3 is a schematic flowchart showing the realization of a method of displaying multiple input boxes in a web page according to another embodiment of the present disclosure. The detailed description is as follows.

In step S301, the focus input box in the web page currently displayed by the terminal device is obtained, and the IME soft keyboard is displayed in the input process to the focus input box.

In this embodiment, in the input process to the focus input box, typically, the IME soft keyboard is displayed under the input box, so that the user can operate conveniently, and at this time, the other input boxes under the focus input box may be covered by the IME soft keyboard.

In step S302, the other input boxes in the web page are searched for in a preset distance range of the focus input box.

In this embodiment, the found other input boxe(s) may be one or more.

In step S303, the web page and/or the canvas of the display screen of the terminal device are (is) rolled when the found other input boxes are located in a lower level of the IME soft keyboard, so that the focus input box and the other input boxes are displayed in a visible area of the display screen of the terminal device simultaneously.

In this embodiment, the following operations are carried out: obtaining a focus input box in a web page currently displayed by a terminal device; displaying the IME soft keyboard in the input process of the focus input box; searching for the other input boxes in the web page in a preset distance range of the focus input box; rolling the web page and/or the canvas of the display screen of the terminal device when the other input boxes are located in a lower level of the IME soft keyboard, so that the focus input box and the other input boxes are displayed in a visible area of the display screen of the terminal device simultaneously. Because in the operation process to the input box, the input box located in a lower level of the IME soft keyboard is moved to a visible area of the display screen of the terminal device, there is no need to turn off the IME soft keyboard or move the input box to operate the input box directly in the operation process to the input box.

Figure 4:
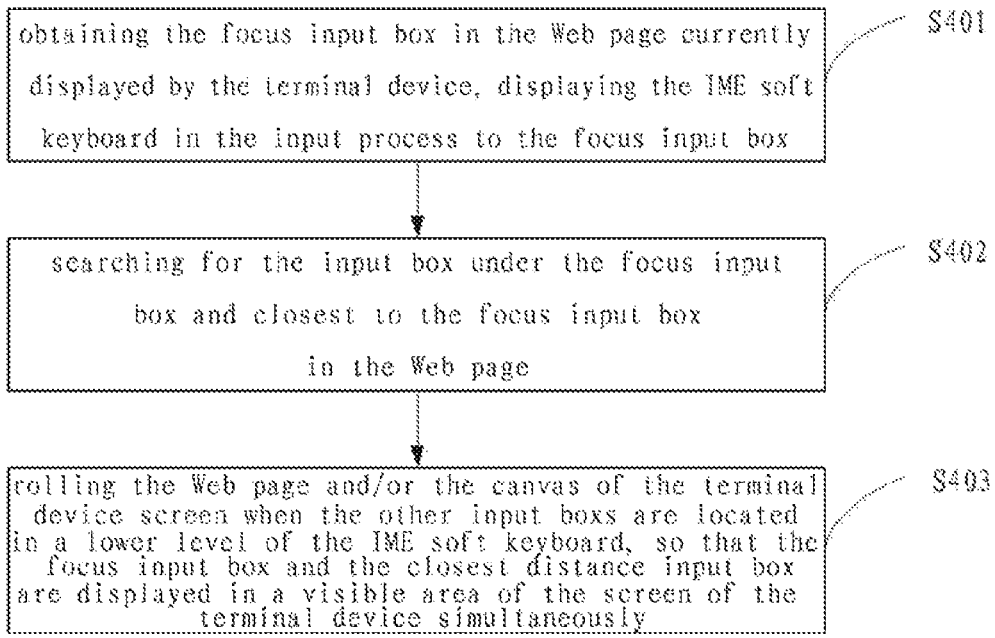
FIG. 4 is a schematic flowchart showing the realization of a method of displaying multiple input boxes in a web page according to yet another embodiment of the present disclosure.

FIG. 4 is a schematic flowchart showing the realization of a method of displaying multiple input boxes in a web page according to yet another embodiment of the present disclosure. The detailed description is as follows.

In step S401, the focus input box in the web page currently displayed by the terminal device is obtained, and the IME soft keyboard is displayed in the input process to the focus input box.

In step S402, the input box under the focus input box in the web page and closest to the focus input box is searched for.

In this embodiment, the step S402 is embodied as:

1. obtaining the Document Object Model (DOM) tree. In this embodiment, when the page is loaded, the login web page in FIG. 1 will be parsed, and a simple DOM tree of the login page is obtained.

Figure 1:
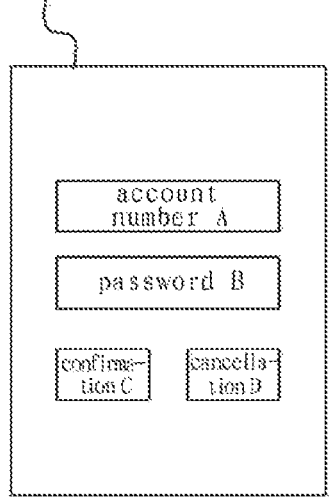
FIG. 1 is a schematic diagram showing a web page including multiple input boxes.
Figure 5:
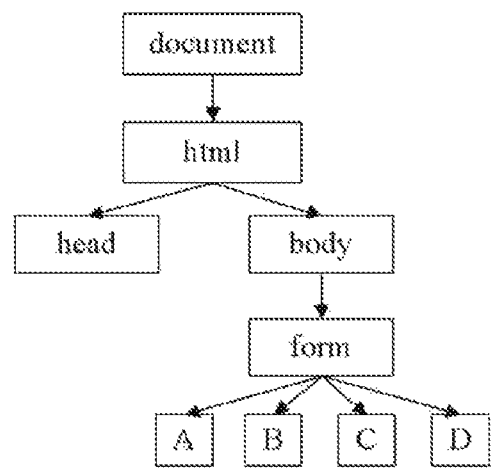
FIG. 5 is a schematic diagram showing the DOM tree obtained through the analysis on the web page of FIG. 1 according to the yet another embodiment of the present disclosure.

FIG. 5 is a schematic diagram showing the DOM tree obtained through the analysis on the web page of FIG. 1 according to the yet another embodiment of the present disclosure. As shown in FIG. 5, in the document object "document", A, B, C, D may represent different objects in the web page, in this embodiment, for example, they may represent different input boxes (including a focus input box and other input boxes), they have a common parent node "form", and the parent node "form" exists in the webpage main body "body". The webpage main body "body" and the head "head" together constitute the web page "html" in the document object "document" of the web page.

2. In the DOM tree, the parent node"form" that the focus input box corresponds to is searched for.

3. The DOM tree of which the parent node "form" is root node is traversed, and the input box under the focus input box in the web page and closest to the focus input box is searched for.

The above operation "according to the analysed DOM tree, the input box under the focus input box in the web page and closest to the focus input box is searched for" can use the following program flow:

focusNode=A; obtaining the node A of the current focus input box;

form=parent(A); obtaining the parent node "form" of the node A;

preorder (form); traversing the DOM tree of which the parent node "form" is root in preorder;

It is determined whether a node n is an input tag or not. If the node n is the input tag, and the bottom of the node A is smaller than the top of the node n (that is, the node n is under the node A), it returns the node n as the input box under the focus input box A.

In step S403, the web page and/or the canvas of the display screen of the terminal device are (is) rolled when the closest distance input boxes are located in a lower level of the IME soft keyboard, so that the focus input box and the closest distance input box are displayed in a visible area of the display screen of the terminal device simultaneously.

In this embodiment, for a portable terminal device that its display screen is smaller, in order to be able to display more other contents, in the input process to the current focus input box, only the input box under the focus input box and closest to the focus input box may be displayed at the same time. For example, for the input box A, B, C, D in FIG. 1, when the A is clicked, if the visible area can accommodate the A and B at the same time, the B is also displayed. Similarly, when the B is clicked, if the visible area can accommodate the B and C at the same time, the C is also displayed (because the C and the D are in the same line, so the D is also displayed).

Alternatively, "the web page and/or the canvas of the display screen of the terminal device are (is) rolled, so that the focus input box and the closest distance input box are displayed in a visible area of the display screen of the terminal device simultaneously" in step S403 can be realized by taking the following manner: when the web page can be rolled upward, the web page is rolled upward, so that the focus input box and the closest distance input box are displayed in a visible area of the display screen of the terminal device simultaneously; or when the web page can not be rolled upward, the canvas of the terminal device is rolled upward, so that the focus input box and the closest distance input box are displayed in a visible area of the display screen of the terminal device simultaneously; or when the bottom of the web page is rolled to the bottom of the display screen, if the focus input box and the closest distance input box have not been displayed in a visible area of the display screen of the terminal device simultaneously, the canvas of the web page is rolled upward, so that the focus input box and the closest distance input box are displayed in a visible area of the display screen of the terminal device simultaneously.

In this embodiment, through the rolling of the web page, the rolling of the canvas of the display screen of the terminal device, or the combination of the rolling of the web page and the rolling of the canvas of the display screen of the terminal device, making the focus input box and the closest distance input box be displayed in a visible area of the display screen of the terminal device simultaneously can be guaranteed, so that when the operation on the current focus input box is finished, the operation on the closest distance input box can be made in time and conveniently.

Alternatively, the step S403 can be realized by taking the following manner: the distance inputDisY between the upper edge of the focus input box and the lower edge of the closest distance input box, the distance H between the upper edge of the IME soft keyboard and the upper edge of the display screen of the terminal device, the distance X between the upper edge of the focus input box and the upper edge of the IME soft keyboard, the distance Y between the lower edge of the closest distance input box in the target position and the lower edge of the closest distance input box in the original position, the distance Z between the lower edge of the display screen of the terminal device and the lower edge of the web page are calculated.

When H>inputDisY, it is to calculate the rolling distance bitmapDisY of the web page and/or the rolling distance canvasDisY of the canvas of the display screen of the terminal device according to the relations between the calculated X, Y, Z.

According to the bitmapDisY and canvasDisY, the web page and/or the canvas of the display screen of the terminal device are (is) rolled, so that the focus input box and the other input boxes are displayed in a visible area of the display screen of the terminal device simultaneously.

Figure 6:
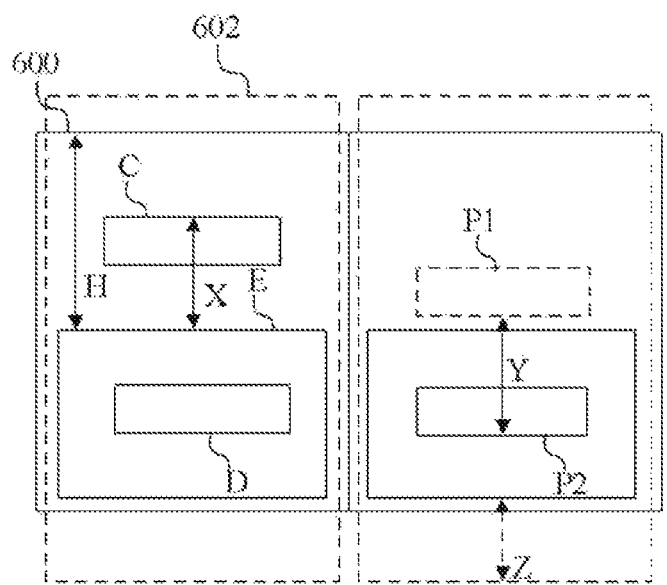
FIG. 6 is a schematic diagram showing the focus input box and the input box closest to the focus input box in the display page of the terminal device according to the yet another embodiment of the present disclosure.

FIG. 6 is a schematic diagram showing the focus input box and the input box closest to the focus input box in the display page of the terminal device according to the yet another embodiment of the present disclosure.

For convenience of understanding, the above rolling process in this embodiment will be illustrated by a concrete example, but it is not limited to the example. As shown in FIG. 6, on the display screen of the terminal device 600, a coordinate system that the upper left corner of the display screen of the terminal device is the origin is established, to right is the positive direction of the horizontal direction, to down is the positive direction of the vertical orientation, in which, the broken line box 602 is the web page, the input box C is the focus input box in the web page, the input box D is the input box that is closest to the focus input box, the E is the IME soft keyboard, the P2 is the original position of the input box D, the P1 is the target position of the input box D, the target position is the position that the input box D is located in after the page is moved, H is the distance between the upper edge of the IME soft keyboard and the display screen of the terminal device, X is the distance between the upper edge of focus input box and the upper edge of the IME soft keyboard, Y is the distance between the lower edge of the closest distance input box in the target position and the lower edge of the closest distance input box in the original position, Z is the distance between the lower edge of the display screen of the terminal device and the lower edge of the web page, the realizing process of step S403 is:

1. calculating the distance (inputDisY) between the upper edge of the focus input box C (rect(C)·top) and the lower edge of the closest distance input box D (rect(D)·bottom);

inputDisY=rect(D)·bottom−rect(C)·top 2. calculating the rolling distance of the web page bitmapDisY and/or the canvas rolling distance of the terminal device screen canvasDisY, and the page and/or the canvas of the display screen of the terminal device are (is) rolled according to the calculated result.

Figure 7:
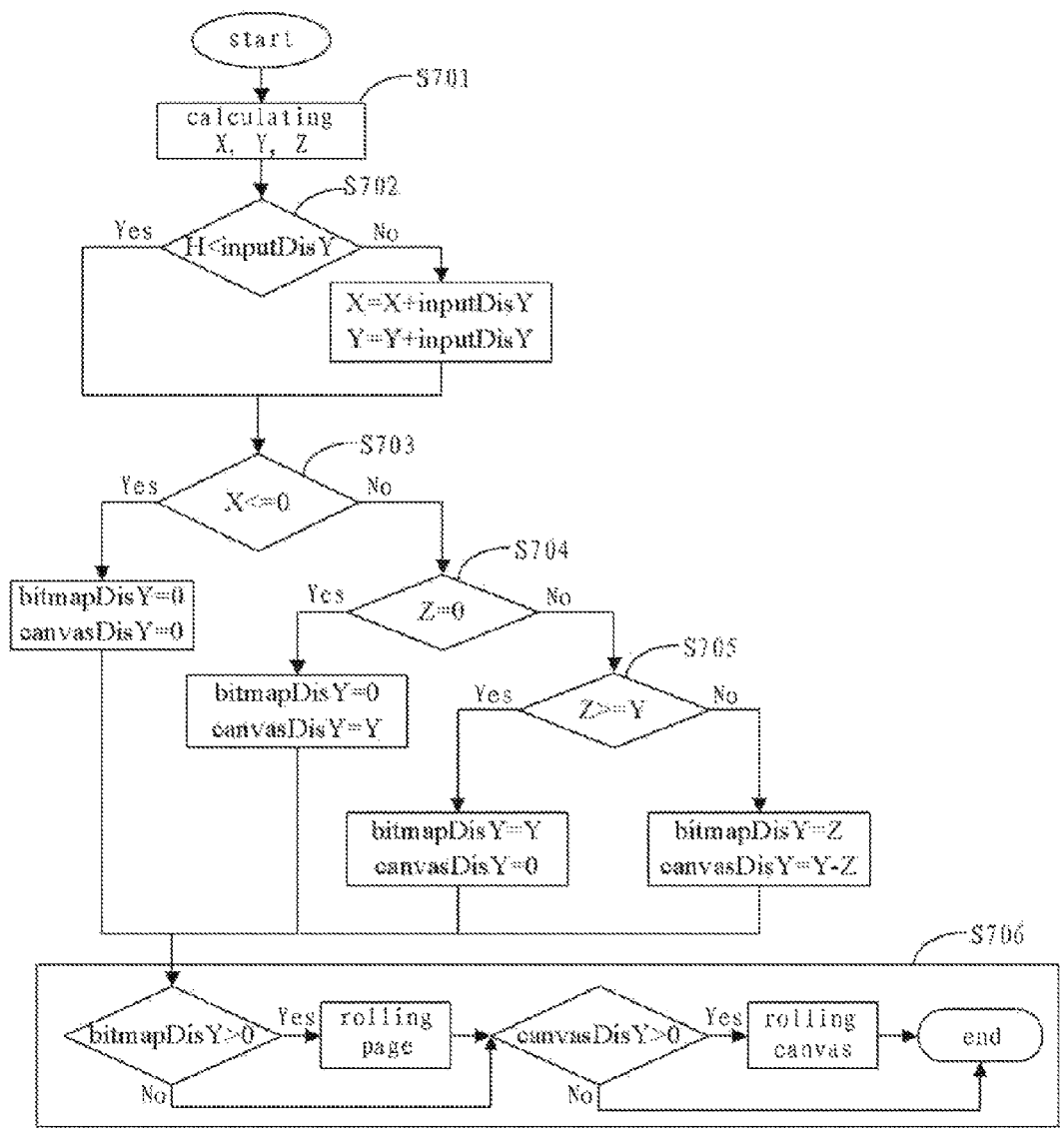
FIG. 7 is a schematic flowchart showing the calculation of a rolling distance of the web page and/or a rolling distance of the canvas of the display screen of the terminal device according to the yet another embodiment of the present disclosure.

FIG. 7 is a schematic flowchart showing the calculation of the rolling distance of the web page and/or the rolling distance of the canvas of the display screen of the terminal device according to the yet another embodiment of the present disclosure. The processing flow as shown in FIG. 7 is as follows.

In step S701, X, Y, Z are calculated. The method of calculating the values of X, Y, Z belongs to the method of calculating the coordinates of points and distances of the display screen, the present disclosure does not make a concrete limitation to the method, those skilled in the art can calculate the values of X, Y, Z according to the prior art using any method. In step S702, it is to determine whether H is less than inputDisY or not, if H<inputDisY, then at this time the display screen of the device can not display the input box C and the input box D simultaneously, and step S703 is to be executed. if H≥inputDisY, it means that at this time the display screen of the device can display the input box C and the input box D simultaneously, then X=X+inputDisY, Y=Y+inputDisY are calculated, then step S703 is executed. Wherein, the obtained new X after calculation is the distance between the upper edge of the next input box of the focus input box and the upper edge of the IME soft keyboard, the obtained new Y is the distance between the lower edge of the next input box of the closest distance box in target position and the lower edge of the closest distance box in original position.

In step S703, It is to determine whether X is less than or equal to 0 or not. If X≤=0, that is, the distance of between the upper edge of the focus input box C and the upper edge of the IME soft keyboard is less than 0, it means the focus input box C is also under the IME soft keyboard, then let bitmapDisY=0, canvasDisY=0, then step S706 is executed, and the processing is ended; if X>0, the step S704 is executed.

In step S704, it is to determine whether Z is equal to 0 or not. If Z=0, it means the web page can not be rolled. At this moment, the operation to move input box only can be executed by rolling the canvas of the display screen, so let bitmapDisY=0, canvasDisY=Y, and after the calculation, step S706 is executed. If Z≠0, it means the web page can be rolled, therefore, next, the step S705 is executed.

In step S705, it is to determine whether Y is less than or equal to Z or not. If Y>Z, it means both the web page and the canvas of the display screen need to be rolled, then let bitmapDisY=Z, canvasDisY=Y−Z, and after the calculation, the step S706 is executed. If Y≤Z, it means the operation to move input box D can be executed just through rolling the web page, so let bitmapDisY=Y, canvasDisY=0, and after the calculation, the step S706 is executed.

In step S706, if bitmapDisY>0, it is to execute an internal rolling (that is, the webpage is rolled upward by the distance equal to the value of bitmapDisY); if canvasDisY>0, the canvas is rolled upward by the distance equal to the value of canvasDisY), finally the input box C and input box D are displayed in a visible area of the display screen reasonably.

In this embodiment, the following operations are carried out: obtaining a focus input box in a web page currently displayed by a terminal device; displaying the IME soft keyboard in the input process of the focus input box; searching for the input box in the web page that is under the focus input box and is closest to the focus input box; rolling the web page and/or the canvas of the display screen of the terminal device when the closest distance input box is located in a lower level of the IME soft keyboard, so that the focus input box and the closest distance input box are displayed in a visible area of the display screen of the terminal device simultaneously. Because in the operation process to the input box, the input box that is closest to the focus input box and located in a lower level of the IME soft keyboard is moved to a visible area of the display screen of the terminal device, there is no need to turn off the IME soft keyboard or move the input box manually to operate the input box directly.

Figure 8:
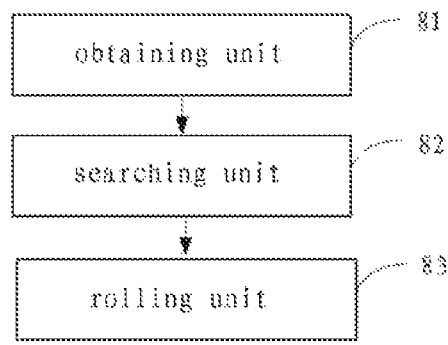
FIG. 8 is a schematic block diagram showing an apparatus of displaying multiple input boxes in a web page according to a further embodiment of the present disclosure.

FIG. 8 is a schematic block diagram showing an apparatus of displaying multiple input boxes in a web page according to a further embodiment of the present disclosure. For convenience of illustration, only the parts corresponding to the embodiment of the present disclosure is shown, the display apparatus may be software modules, hardware units, or the units combining the software and the hardware built in the terminal device.

The apparatus include: an obtaining unit 81, a searching unit 82, and a rolling unit 83. Wherein, the obtaining unit 81 is configured to obtain the focus input box in the currently displayed web page of the terminal device. The searching unit 82 is configured to search for other input boxes in the web page in a preset distance range of the focus input box. The rolling unit 83 is configured to roll the web page and/or the canvas of the display screen of the terminal device when the other input boxes are located in a lower level of an interface, so that the focus input box and the other input boxes are displayed in a visible area of the display screen of the terminal device simultaneously.

The apparatus of displaying multiple input boxes in a web page provided by this embodiment can use the above corresponding method in embodiment 1, Please refer to the description of the above embodiment 1 for details, and the repeated description thereof is omitted here.

Figure 9:
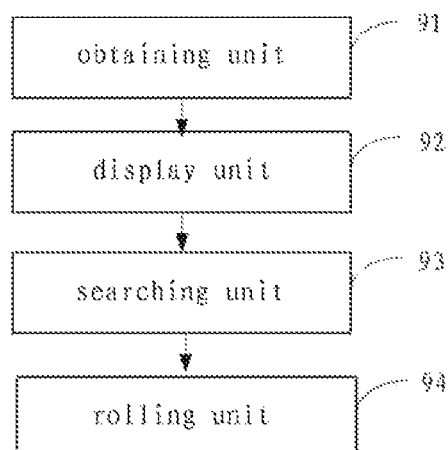
FIG. 9 is a schematic block diagram showing an apparatus of displaying multiple input boxes in a web page according to a yet further embodiment of the present disclosure.

FIG. 9 is a schematic block diagram showing an apparatus of displaying multiple input boxes in a web page according to a yet further embodiment of the present disclosure. For convenience of illustration, only the parts corresponding to the embodiment of the present disclosure is shown, the apparatus may be software modules, hardware units, or the units combining the software and the hardware built in the terminal device.

The apparatus include: an obtaining unit 91, a display unit 92, a searching unit 93, and a rolling unit 94. The obtaining unit 91 is configured to obtain the focus input box in the currently displayed web page of the terminal device. The display unit 92 is configured to display the IME soft keyboard in the input process to the focus input box. The searching unit 93 is configured to search other input boxes in the web page in a preset distance range of the focus input box. The rolling unit 94 is configured to roll the web page and/or the canvas of the display screen of the terminal device when the other input boxes are located in a lower level of the IME soft keyboard, so that the focus input box and the other input boxes are displayed in a visible area of the display screen of the terminal device simultaneously.

The apparatus of displaying multiple input boxes in a web page provided by this embodiment can use the above corresponding method in embodiment 2, Please refer to the description of the above embodiment 2 for details, and the repeated description thereof is omitted here.

Figure 10:
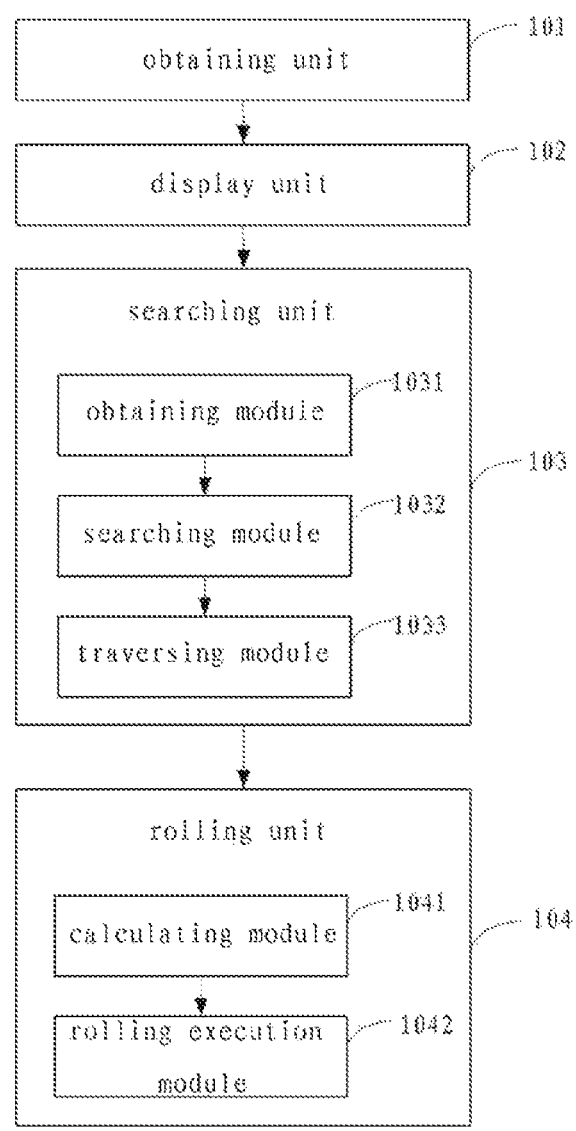
FIG. 10 is a schematic block diagram showing an apparatus of displaying multiple input boxes in a web page according to yet further another embodiment of the present disclosure.

FIG. 10 is a schematic block diagram showing an apparatus of displaying multiple input boxes in a web page according to yet further another embodiment of the present disclosure. For convenience of illustration, only the parts corresponding to the embodiment of the present disclosure is shown, the apparatus may be software modules, hardware units, or the units combining the software and the hardware built in the terminal device.

The apparatus include: an obtaining unit 101, a display unit 102, a searching unit 103, and a rolling unit 104. The obtaining unit 101 is configured to obtain the focus input box in the currently displayed web page of the terminal device. The display unit 102 is configured to display the IME soft keyboard in the input process to the focus input box. The searching unit 103 is configured to search the input box in the web page that is under the focus input box and is closest to the focus input box. The rolling unit 104 is configured to roll the web page and/or the canvas of the display screen of the terminal device when the closest distance input box is located in a lower level of the IME soft keyboard, so that the focus input box and the closest distance input box are displayed in a visible area of the display screen of the terminal device simultaneously.

Alternatively, the searching unit 103 includes: an obtaining module 1031 configured to obtain DOM tree of the web page; a searching module 1032 configured to search for the parent node "form" that the focus input box corresponds to in the DOM tree; a traversing module 1033 configured to traverse the DOM tree of which the parent node "form" is a root node to search for the input box under the focus input box in the web page and closest to the focus input box.

Alternatively, the rolling unit 104 is configured: when the web page can be rolled upward, to roll the web page upward, so that the focus input box and the closest distance input box are displayed in a visible area of the display screen of the terminal device simultaneously; when the web page can not be rolled upward, to roll the canvas of the terminal device upward, so that the focus input box and the closest distance input box are be displayed in a visible area of the display screen of the terminal device simultaneously; and when the bottom of the web page is rolled to the bottom of the display screen, if the focus input box and the closest distance input box have not been displayed in a visible area of the display screen of the terminal device simultaneously, to roll the canvas of the web page upward, so that the focus input box and the closest distance input box are displayed in a visible area of the display screen of the terminal device simultaneously.

Alternatively, the rolling unit 104 includes a calculating module 1041 and a rolling execution module 1042. The rolling unit 104 is configured to calculate the distance inputDisY between the upper edge of the focus input box and the lower edge of the closest distance input box, the distance H between the upper edge of the IME soft keyboard and the upper edge of the display screen of the terminal device, the distance X between the upper edge of focus input box and the upper edge of the IME soft keyboard, the distance Y between the lower edge of the closest distance input box in the target position and the lower edge of the closest distance input box in the original position, the distance Z between the lower edge of the display screen of the terminal device and the lower edge of the web page.

The calculating module 1041 is also configured: when H>inputDisY, according to the relations among the calculated values of X, Y, Z, to calculate the rolling distance bitmapDisY of the web page and/or the rolling distance canvasDisY of the canvas of the display screen of the terminal device.

The rolling execution module 1042 is also configured: according to the values of bitmapDisY and canvasDisY, to roll the web page and/or the canvas of the display screen of the terminal device, so that the focus input box and the closest distance input box are displayed in a visible area of the display screen of the terminal device simultaneously.

The apparatus of displaying multiple input boxes in a web page provided by this embodiment can use the above corresponding method in embodiment 3, Please refer to the description of the above embodiment 3 for details, and the repeated description thereof is omitted here.

Figure 11:
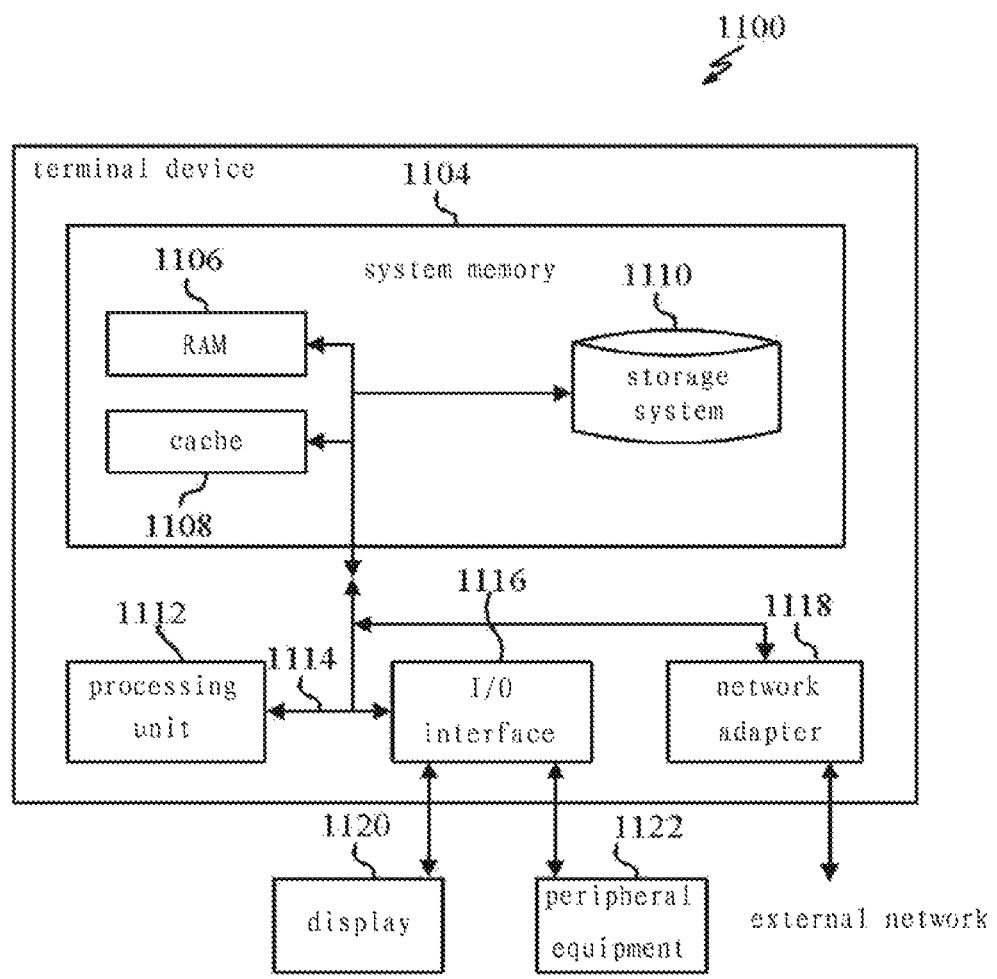
FIG. 11 is a schematic block diagram showing a terminal device that can be used to realize various embodiments of the present disclosure.

FIG. 11 is a schematic block diagram showing a terminal device that can be used to realize the respective embodiments of the present disclosure.

The terminal device 1100 shown in FIG. 11 is just an example and should in no way restrict the function and usage range of embodiments of the present disclosure. As shown in FIG. 11, the terminal device 1100 may be in a general calculating device form. The terminal device 1100 includes, but not limited to: one or more processor(s) or processing unit(s) 1112, system memory(s) 1104, I/O interface(s) 1116, network adapter(s) 1118, display(s) 1120, peripheral equipment (s) 1122, and bus (s) 1114 that can couple different modules.

The bus 1114 represents any one or more of multiple bus structures. For example, the bus structures include, but not limited to an Industry Standard Architecture (ISA) bus, a Microchannel Architecture (MAC) bus, an Enhancement Mode ISA bus, a Video Electronic Standard Association (VESA) local bus, and a Peripheral Component Interconnection (PCI) bus, and the like.

The terminal device 1100 typically includes multiple computer system readable medium. The medium may be any readable medium that the terminal device 1100 can access, including a volatile medium, a non-volatile medium, a movable medium, and a non-movable medium.

The system memory 1104 may include a readable medium in volatile storage form, for example, a Random Access Memory (RAM) 1106 and/or a cache 1108. The terminal device 1100 may further includes other movable medium/non-movable, volatile medium/non-volatile media. For example, the terminal device 1100 (usually is referred to as "hard disk drive") may be used to read from or write into a non-movable, non-volatile medium. Although not shown in the figure, it is also possible to provide a magnetic disk drive used to read from or write into a movable, non-volatile magnetic disk (for example, floppy disk), and an optical disk drive used to read from or write into a movable, nonvolatile optical disk (for example, CD-ROM, DVD-ROM or other optical medium). In those cases, each drive can be connected to the bus 1114 through one or more data medium interface(s).

The system memory 1104 may include at least one program product. The program product has a group (at least one) of program modules, and can be stored in a storage system 1110. The program modules include computer executable program instructions. The program modules are configured to execute program instructions therein through a processing unit 1112 to execute the functions of the respective embodiments of the present disclosure. The program modules include, but not limited to an operating system, one or more application program(s), other program modules, and program data. Each or certain combination in an example of those program modules may include the realization of a network environment.

The terminal device 1100 may also communicate with one or more peripheral equipment(s) 1122 (for example, a keyboard, a mouse) and display(s) 1120, and the like, and also communicate with one or more device(s) that can make the user interact with the terminal device 1100. The communication can be made through an input/output (I/O) interface 1116. Moreover, the terminal device 1100 may also communicate with one or more network (s) (for example, a Local Area network (LAN), a Wide Area Network (WAN) and/or a public network, for example, the Internet) through a network adapter 1118. As shown in FIG. 11, the I/O interface 1116 and the network adapter 1118 communicate with the other modules of the terminal device 1100 through the bus 1114. It should be understood that although it is not show in the Figure, the other hardware and/or software modules can be used through the terminal device 1100, those other hardware and/or software modules can be, but not limited to microcodes, a device drive, a redundance processing units, an external disk drive array, a RAID system, an magnetic tape drive, and a data backup storage system, or the like.

The respective units of the respective embodiments of the present disclosure can be realized by executing the program modules having the computer program instructions in the terminal device 1100. Moreover, for example, the display screens in the respective embodiments of the present application can be, but not limited to the display screen of the display 1120.

It should also be noted that the respective units included in the above respective embodiments are just divided according to the function logic, but not limited to thereto, as long as the corresponding functions can be realized. In addition, the concrete names of the respective units are just to be used for making distinguish conveniently, not to limit the scope of protection of the present disclosure.

Moreover, it should be understood by those skilled in the art that all or part of the steps of the above respective embodiments can be realized through the program instructing the related hardware. The corresponding program can be stored into a computer-readable storage medium, for example, the storage medium may be a ROM/RAM, a magnetic disk, or an optical disk, or the like. What described above are only the preferred embodiments, and should in no way restrict the disclosure. Any modifications, equivalent substitutions, and improvements within the sprit and principle of the present disclosure should be include in the scope of protection of the present disclosure.

The invention claimed is:

1. A method of displaying multiple input boxes in a web page, comprising:
   obtaining, by an obtaining unit using a processor, a focus input box in a web page currently displayed by a terminal device;
   searching, by a searching unit using a processor, for other input boxes in the web page in a preset distance range of the focus input box;
   rolling, by a rolling unit using a processor, the web page and/or a canvas of a display screen of the terminal device when the other input boxes are located in a lower level of an interface, so that the focus input box and the other input boxes are displayed in a visible area of the display screen of the terminal device simultaneously; and
   displaying, by a display module using a processor, an Input Method Editor (IME) soft keyboard in an input process of the focus input box,
   wherein the step of searching for other input boxes in the web page in a preset distance range of the focus input box comprises searching for the input box in the web page that is under the focus input box and closest to the focus input box;
   the step of rolling the web page and/or canvas of a display screen of the terminal device when the other input boxes are located in a lower level of an interface, so that the focus input box and the other input boxes are displayed in a visible area of the display screen of the terminal device simultaneously comprises rolling the web page and/or the canvas of the display screen of the terminal device when the closest distance input box is located in a lower level of the IME soft keyboard, so that the focus input box and the closest distance input box are displayed in a visible area of the display screen of the terminal device simultaneously, by calculating a distance inputDisY between an upper edge of the focus input box and a lower edge of the closest distance input box, the distance H between an upper edge of the IME soft keyboard and an upper edge of the display screen of the terminal device, the distance X between the upper edge of the focus input box and the upper edge of the IME soft keyboard, the distance Y between the lower edge of the closest distance input box in the target position and the lower edge of the closest distance input box in the original position, the distance Z between the lower edge of the display screen of the terminal device and the lower edge of the web page, when H>inputDisY, calculating a rolling distance bitmapDisY of the web page and/or the rolling distance canvasDisY of the canvas of the display screen of the terminal device according to the relations among X, Y, Z, and according to the values of the bitmapDisY and canvasDisY, rolling the web page and/or the canvas of the display screen of the terminal device, so that the focus input box and the closest distance input box are displayed in a visible area of the display screen of the terminal device simultaneously.

2. The method according to claim 1, the step of searching for the input box in the web page that is under the focus input box and closest to the focus input box comprising:

obtaining a Document Object Model (DOME tree of the web page;

in the DOM tree, searching for the parent node that the focus input box corresponds to;

traversing the DOM tree of which the parent node is a root node, searching for the input box under the focus input box in the web page and closest to the focus input box.

3. The method according to claim 1, the step of rolling the web page and/or the canvas of the display screen of the terminal device, so that the focus input box and the closest distance input box are displayed in a visible area of the display screen of the terminal device simultaneously comprising:

when the web page can be rolled upward, the web page is rolled upward, so that the focus input box and the closest distance input box are displayed in a visible area of the display screen of the terminal device simultaneously;

when the web page cannot be rolled upward, the canvas of the display screen of the terminal device is rolled upward, so that the focus input box and the closest distance input box are displayed in a visible area of the display screen of the terminal device simultaneously;

when the bottom of the web page is rolled to the bottom of the display screen, if the focus input box and the closest distance input box have not been displayed in a visible area of the display screen of the terminal device simultaneously, the canvas of the display screen of the terminal device is rolled upward, so that the focus input box and the closest distance input box are displayed in a visible area of the display screen of the terminal device simultaneously.

4. A terminal device comprising a memory and a processor coupled to the memory, the memory storing instructions that when being executed by the processor cause the processor to perform the following operations of:

obtaining a focus input box in a web page currently displayed by a terminal device;

searching for other input boxes in the web page in a preset distance range of the focus input box;

rolling the web page and/or a canvas of the display screen of the terminal device when the other input boxes are located in a lower level of an Input Method Editor (IME) soft keyboard, so that the focus input box and the other input boxes are displayed in a visible area of the display screen of the terminal device simultaneously; and displaying, by a display module using a processor, the IME soft keyboard in input process of the focus input box, wherein the step of searching for other input boxes in the web page in a preset distance range of the focus input box comprises searching for the input box in the web page that is under the focus input box and closest to the focus input box, the step of rolling the web page and/or the canvas of the display screen of the terminal device when the other input boxes are located in a lower level of the IME soft keyboard, so that the focus input box and the other input boxes are displayed in a visible area of the display screen of the terminal device simultaneously comprises rolling the web page and/or the canvas of the display screen of the terminal device when the closest distance input box is located in a lower level of the IME soft keyboard, so that the focus input box and the closest distance input box are displayed in a visible area of the display screen of the terminal device simultaneously, by calculating a distance inputDisY between an upper edge of the focus input box and a lower edge of the closest distance input box, the distance H between an upper edge of the IME soft keyboard and an upper edge of the display screen of the terminal device, the distance X between the upper edge of the focus input box and the upper edge of the IME soft keyboard, the distance Y between the lower edge of the closest distance input box in the target position and the lower edge of the closest distance input box in the original position, the distance Z between the lower edge of the display screen of the terminal device and the lower edge of the web page, when H>inputDisY, calculating a rolling distance bitmapDisY of the web page and/or the rolling distance canvasDisY of the canvas of the display screen of the terminal device according to the relations among X, Y, Z, according to the values of the bitmapDisY and canvasDisY, rolling the web page and/or the canvas of the display screen of the terminal device, so that the focus input box and the closest distance input box are displayed in a visible area of the display screen of the terminal device simultaneously.

5. The terminal device according to claim 4, wherein the instructions when executed by the processor further cause the processor to perform the following operations:

obtaining a Document Object Model (DOM tree of the web page;

in the DOM tree, searching for a parent node that the focus input box corresponds to;

traversing the DOM tree of which the parent node is a root node, search for the input box under the focus input box in the web page and closest to the focus input box.

6. The terminal device according to claim 4, wherein the instructions when executed by the processor further cause the processor to perform the following operations:

when the web page can be rolled upward, to roll the web page upward, so that the focus input box and the closest distance input box are displayed in a visible area of the display screen of the terminal device simultaneously;

when the web page cannot be rolled upward, to roll the canvas of the display screen of the terminal device upward, so that the focus input box and the closest distance input box are displayed in a visible area of the display screen of the terminal device simultaneously; and when the bottom of the web page is rolled to the bottom of the display screen, if the focus input box and the closest distance input box have not been displayed in the visible area of the display screen of the terminal device simultaneously, to roll the canvas of the display screen of the terminal device upward, so that the focus input box and the closest distance input box are displayed in the visible area of the display screen of the terminal device simultaneously.

\* \* \* \* \*